Patented Mar. 20, 1945

2,371,997

UNITED STATES PATENT OFFICE 2,371,997

RESINOUS COMPOSITIONS

Fred W. Hoover and Gordon T. Vaala, Wilmington, Del., assignors to E. I. du Pont de Nemours & Company, Wilmington, Del., a corporation of Delaware No Drawing. Application October 21, 1942, Serial No. 462,843

6 Claims. (Cl. 260—42)

This invention relates to new compositions of matter and more particularly to molding compositions.

Urea-formaldehyde resins have limited use in moldings due primarily to their low resistance to shock (low impact strength). For example, urea-formaldehyde resins cannot be used successfully in telephone parts, table construction, automobile parts, etc. because of excessive breakage. Furthermore, urea-formaldehyde resins have low resistance to water.

This invention has as an object the production of new and useful compositions of matter. A further object comprises improved resinous molding compositions yielding molded products having a high resistance to shock and to the action of water. A further object is the preparation of molding compositions of this kind which are also capable of producing transparent and brilliant colored molded products. A further object is the manufacture of new and improved molded articles. Still further objects reside in methods for obtaining these compositions and articles. Other objects will appear hereinafter.

The above mentioned compositions are obtained by reacting under resin-forming conditions and in the presence of a substantial amount of water in the manner described herein ingredients consisting preponderantly of a urea, an aldehyde and a diamine-dicarboxylic acid salt.

The diamine-dibasic acid salt should be present in amount of at least 5% by weight of the total weight of the resin. Amounts as high as 75% of the salt can be used but the best results are obtained with amounts between 20% and 50%. Salts of this type are described in U. S. Patent 2,130,947. They are conveniently obtained by intimate contact of approximately equimolecular amounts of a diamine and dicarboxylic acid, for example, by solution of both reactants in an alcohol or aqueous solvent.

The ratio of formaldehyde to urea can be from about 1.5–3.0 to 1.0. A ratio of 1.75–250 to 1 is usually preferred since lower ratios tend to give opaque products and higher ratios cause inferior water resistance, hardness and stiffness.

Although the reaction forming the present resins will take place on contact of the ingredients, it is desirable to accelerate the reaction by heat treatment. The reactants are dissolved in an aqueous medium and reacted at 0° C.–100° C., preferably 50°–100° C., until the reaction has proceeded to the desired extent. The length of the heating cycle required depends upon the temperature used and the degree of condensation desired. Any of the conventional methods may be used in determining the extent of the reaction, such as measuring the viscosity increase or determining the free formaldehyde content of the reaction mixture. If no filler is added, it is generally preferred to continue the reaction to the point of incipient gelation as noted by an abrupt viscosity increase. Although fillers may be added to the dried resins, it is usually desirable to add the filler to the reaction mixture prior to the gelation point after which the reaction may be carried further. However, it is generally not preferred to carry the reaction further after the addition of the filler. The resin obtained, filled or unfilled, can be air-dried at room temperature or dried in any conventional apparatus such as a vacuum oven or shelf drier at elevated temperatures.

Although acidic or basic catalysts such as ammonium sulfate, formic acid, sodium hydroxide, and trisodium phosphate may be used in the condensation, the reaction is effected quite satisfactorily without a catalyst and it is generally preferred that no catalyst be used. The resins may be comminuted, compacted and put in the proper form for molding by any of the conventional methods known to those skilled in the art.

It is to be observed that analogous compositions prepared in organic media have properties substantially different than those which characterize the present products. For example, resins prepared from the same reactants in alcohol media, such as isobutyl alcohol, are more pliable, softer, and have substantially less strength. It is also possible to obtain a modified urea-formaldehyde resin by first reacting the diamine-dibasic acid salt with urea, for example, by fusing these two ingredients and then reacting the product thus obtained with formaldehyde. These products, however, have no particular merit as molding compositions in that the molded products obtained are soft, pliable, opaque and comparatively low in impact strength.

The following examples are further illustrative of methods for practicing the invention.

*Example I*

A mixture of 240 parts of urea, 648 parts of 37% aqueous formaldehyde and 209.6 parts of hexamethylenediammonium adipate is heated under reflux until gelation occurs (approximately 25 minutes). The gelled mass is air-dried 16 hours at room temperature and then dried in a shelf drier at 50°–53° C. for 3½ hours. The resultant dried resin is ball-milled and then molded at 150° C. for 6 minutes under a pressure of 2000 lbs./sq. in. Satisfactory molded articles can also be obtained using lower temperatures and longer cycles or higher temperatures and shorter cycles. Clear, water-white, transparent, tough articles are obtained. These articles are superior to unmodified urea-formaldehyde resins, particularly in regard to toughness, as indicated by the fact that they possess an impact strength of 0.64 foot pounds per inch of notch (Charpy method), as compared to the published value of 0.30–0.36 for commercial urea-formaldehyde resins.

Example II

A mixture of 120 parts of urea, 324 parts of 37% aqueous formaldehyde and 104.3 parts of hexamethylenediammonium adipate is heated under reflux for 6 minutes, cooled to room temperature and mixed with 183 grams of cellulose (high grade alpha cellulose in pulp form) using a Werner and Pfleiderer mixer. The mixture is dried in a shelf drier for 13 hours at 50°–53° C. and then comminuted by means of a micropulverizer. The resultant resin is molded at 150° C. for 6 minutes under a pressure of 2000 lbs./sq. in. The molded specimens are rigid, and are tough and strong as shown by the fact that they possess an impact strength of 0.48 foot pounds per inch of notch (Charpy method).

Example III

Sixty parts of urea, 162 parts of 37% formaldehyde and 50.9 parts of hexamethylenediammonium sebacate are heated under reflux until the mass begins to gel. The resultant mass is air-dried at room temperature for 72 hours and then dried in a vacuum oven at 50° C. for 3 hours. The dried resin is ball-milled and molded at 150° C. for 5 minutes under a pressure of 2000 lbs./sq. in. The resultant articles possess good clarity and outstanding toughness.

Example IV

Sixty parts of urea, 162 parts of 37% formaldehyde and 50.9 parts of decamethylenediammonium adipate are heated under reflux until the mass begins to gel. The resultant mass is air-dried at room temperature for 72 hours and then dried in a vacuum oven at 50° C. for 3 hours. The dried resin is ball-milled and molded at 150° C. for 5 minutes under a pressure of 2000 lbs./sq. in. The resultant articles possess good clarity and outstanding toughness.

Example V

Sixty parts of urea, 162 parts of 37% formaldehyde and 51.5 parts of ethylenediammonium adipate are heated 51 minutes under reflux. After standing overnight the reaction mixture sets to a soft gel. After air-drying at room temperature for 72 hours the resin is dried 3 hours at 50° C. in a vacuum oven. The dried resin is ball-milled and molded at 150° C. for 5 minutes under a pressure of 2000 lbs./sq. in. Tough articles are obtained which possess a slight reddish color.

Example VI

A mixture of 162 parts of 37% formaldehyde, 60 parts of urea, and 52.4 parts of ethylenediammonium sebacate is heated under reflux for 40 minutes. The mixture is allowed to stand overnight during which time a semi-solid mass forms. After drying in a vacuum oven 15 hours at 50° C. the resin is ball-milled and molded at 150° C. for 5 minutes under a pressure of 2000 lbs./sq. in. The resultant articles are slightly colored and relatively tough.

Example VII

Sixty parts of urea, 162 parts of 37% formaldehyde and 26.2 parts of hexamethylenediammonium adipate are heated under reflux until gelation occurs. The resultant gel is air-dried at room temperature for 4 days and molded at 135° C. for 5 minutes under a pressure of 2000 lbs./sq. in. The resultant articles are clear, water-white, and possess comparatively good toughness.

The products of this invention can be molded at 60°–200° C. depending on the pressure and length of heating cycle used. However, temperatures of 100°–180° C. are generally preferred. For most molding equipment, temperatures of 130°–160° C. are usually most practical. Pressures from 500 to 20,000 pounds per square inch can be used for molding. However, in most cases pressures of from 1000 to 10,000 pounds per square inch are sufficient and, in general, 1500–3500 pounds per square inch are preferred. The heating cycle in the molding operation may vary from ½ minute to 24 hours, depending upon the temperature and pressure employed. For most moldings a cycle of 1–20 minutes is satisfactory. In general, a cycle of 4–8 minutes is preferred.

Molding catalysts may be used, and in general, those suitable for conventional urea-formaldehyde resins are satisfactory. For example, beta-bromo-hydrocinnamic acid, ammonium sulfate, ammonium chloride, benzoic acid, dibromstyrene are typical molding catalysts. However, it is not necessary to employ molding catalysts and in most applications they are not preferred. Opacifiers, fillers, pigments, lubricants, and other resins such as phenol-formaldehyde, nylon and cellulose acetate may be incorporated in these resins by adding them to the resin syrup before drying or mixing them with the dry resin powder. Modifiers such as these form essentially physical mixtures.

In place of formaldehyde there can be used any aldehyde, for example, aliphatic acyclic aldehydes such as acetaldehyde, propionaldehyde, butyraldehyde, and other homologs of this series, unsaturated aldehydes, for example, acrolein, crotonaldehyde and other homologous unsaturated aldehydes, cyclic aldehydes both aliphatic and aromatic, for example, furfuraldehyde, benzaldehyde, anisaldehyde, and salicylaldehyde. Other water soluble forms of formaldehyde, for example, trioxane, can also be used.

The diamine-dibasic acid salts of this invention are those which are incapable of forming ring compounds. They are salts of diamines having at least one hydrogen on each nitrogen and in which the amino nitrogens are connected by a hydrocarbon chain or ether interrupted hydrocarbon chain, said chain containing at least two carbon atoms, with a dicarboxylic acid in which any chain of atoms connecting the carboxyl groups consists of hydrocarbon or ether interrupted hydrocarbon groups. The sum of the chain atoms connecting the amino groups and the carboxyl groups of the amines and dicarboxylic acids respectively from which the salts are formed is at least three.

The amines from which the diamine-dibasic acid salts of this invention can be formed have the following formula:

$$RNH-R''-NHR'$$

wherein R and R' are hydrogen or alkyl radicals and R'' is a divalent hydrocarbon or ether interrupted hydrocarbon radical containing at least 2 carbon atoms.

The dicarboxylic acids from which the salts used in this invention can be formed have the following formula:

HOOC—R'''$_x$—COOH wherein $x$ equals 0 or 1 and R''' is a divalent hydrocarbon or ether interrupted hydrocarbon radical. The sum of the chain atoms in R'' and R''' is at least three. Preferably R'' and R''' are saturated hydrocarbons having at least 4 chain atoms and R is hydrogen. Salts of the above diamines and dicarboxylic acids have the formula:

RNH—R''—NHR'.HOOC—R'''$_x$—COOH in which R, R', R'', and R''' and $x$ have the values given above.

In addition to the diamine-dibasic acid salts of the examples, suitable salts are trimethylenediammonium oxalate, pentamethylenediammonium oxalate, decamethylenediammonium oxalate, ethylenediammonium malonate, hexamethylenediammonium malonate, tetramethylenediammonium glutarate, and octamethylene-diammonium adipate. Salts formed from secondary diamines can be used, for example, N,N'-dimethylhexamethylenediammonium adipate, N,N'-dipropyldecamethylenediammonium oxalate and N,N' - dibutylpentamethylenediammonium glutarate. One of the amine groups in the diamine can be secondary and the other primary. Salts of this kind are N-ethyltetramethylenediammonium adipate and N-butyloctamethylenediammonium pimelate. Salts in which the hydrocarbon chain is interrupted by ether oxygen can be used, for example, the salt from 3,3'-diamino-dipropyl ether and adipic acid, the salt from tetramethylenediamine and diglycolic acid, the salt from 3,3'-diamino-dipropyl ether and diglycolic acid. Salts formed from aromatic and cycloaliphatic diamines and dicarboxylic acids can be used, for example, 1,4-cyclohexanediammonium succinate, benzidine sebacate, and pentamethylenediammonium terephthalate. Salts containing aliphatic unsaturation can also be used, for example, pentamethylenediammonium fumarate.

The diamine-dibasic acid salt should be present in the reaction in amount of at least 5% by weight as the total weight of the resin. Products containing less than this amount of the salt show no discernible increase in impact strength of the molded products prepared therefrom. Likewise, resins containing more than 75% of the diamine-dibasic acid salts are apt to show decreased water resistance and less favorable properties in the molded products. Resins prepared in accordance with this invention containing from 20 to 50% of the diamine-dibasic acid salt by weight show the most favorable properties particularly with regard to impact strength of molded articles.

In the practice of this invention, as in the production of urea-formaldehyde resins generally, urea can be replaced by thiourea and other equivalent compounds known to the art as useful for the manufacture of urea-formaldehyde resins. Any one of the mono-, sesqui, and di-methylolureas, for example, can be used for a molecularly equivalent amount of urea and formaldehyde.

To obtain the favorable properties of the resins of this invention it is essential that the resin-forming reaction be carried out in the presence of a substantial amount of water. By substantial amount is meant at least 15% by weight of the resin forming reaction. Water is used exclusively as the reaction medium since the presence of organic solvents, particularly those of the alcohol type, have a deleterious effect on the final product. The reaction is ordinarily carried out at the reflux temperature of the reaction mixture at atmospheric pressure but if desired either subatmospheric or superatmospheric pressure can be used and the temperature varied accordingly.

As previously indicated, the compositions of this invention can be molded into hard, tough rigid articles of outstanding impact strength which are clear and water-white unless modified with fillers. The compositions containing fillers can be translucent or opaque, depending on the particular filler employed. Since these resins possess both high impact strength and water-white transparency, they have a unique combination of properties, particularly for thermosetting resins.

The improved molded products described herein are especially useful in the form of clear, water-white unfilled articles or in the form of translucent or opaque articles containing fillers such as cellulose, asbestos, lignin and other resins.

Because of the toughness of the articles molded from the resins provided by this invention, these articles are well adapted for applications requiring shock resistant material, such as telephone, automobile and aircraft parts, furniture construction, housings, handles, closures, radio cabinets and parts, camera cases, kitchen utensils, brush backs and buttons.

When the molded products of this invention are used in the form of clear, water-white, transparent articles, they can be used in many applications now dominated almost entirely by thermoplastic resins. The present products are advantageous over most thermo-plastic resins in having higher softening points, and hence have greater form stability at elevated temperatures. For example, the products of this invention may be used in windows, lenses, magnifying glasses, dentures, dresser sets, containers, decorative articles, cutlery handles, dial and gauge glasses, artificial jewels, compacts, salad sets, dishes, trays, mechanical equipment, refrigerator cold compartment frames and doors, picture frames, combs and similar applications. Furthermore, they are excellently suited for lamp shades, reflectors, windows for ovens and other uses of this sort in which moderately high temperatures are involved.

Colored articles can be molded from the products of this invention which possess remarkable brilliancy, hence can be used in a number of applications wherein brilliant colors are desirable, for example, kitchen utensils, tableware, drinking cups, baking dishes, toilet articles, bathroom fixtures, fountain pens, and mechanical pencils.

Since the products of this invention have good insulating properties they can be used as electrical insulators in a wide variety of applications, for example, distributor heads, condenser and transformer parts, electrical equipment, such as sockets, outlets, plugs, and radio parts.

The present compositions can also be used as binding agents, textile modifying agents, adhesives, baking enamels and insolubilizing agents.

As many apparently widely different embodiments of this invention may be made without departing from the spirit and scope thereof, it is to be understood that we do not limit ourselves to the specific embodiments thereof except as defined in the appended claims.

We claim:

1. A process for obtaining a resinous composition which comprises reacting in the presence of water ingredients comprising urea and an aldehyde in proportions from 1.5 to 3 mols of aldehyde per mol of urea, and the salt obtained from substantially equimolecular proportions of diamine and dibasic carboxylic acid, the water being the sole reaction medium and being present in amount of at least 15% by weight of said ingredients, said salt being present in amount of at least 5% and not more than 75% by weight of said ingredients, said diamine having each amino nitrogen bearing at least one hydrogen and connected by a chain of atoms which contains at least 2 carbon atoms and which is selected from the class consisting of a hydrocarbon chain and an ether interrupted hydrocarbon chain, said dicarboxylic acid being one in which any chain of atoms connecting the carboxyl groups is selected from the class consisting of a hydrocarbon chain and an ether interrupted hydrocarbon chain, the sum of the chain atoms connecting the amino nitrogens and the carboxyl groups being at least 3.

2. A process for obtaining resinous compositions which comprises reacting in the presence of water ingredients comprising urea and formaldehyde in proportions from 1.5 to 3 mols of formaldehyde per mol of urea, and the salt obtained from substantially equimolecular proportions of hexamethylenediamine and adipic acid, the water being the sole reaction medium and being present in amount of at least 15% by weight of said ingredients, said salt being present in amount of at least 5% and not more than 75% by weight of said ingredients.

3. The resinous composition obtained by the process set forth in claim 1.

4. The resinous composition obtained by the process set forth in claim 2.

5. An article obtained by molding under heat and pressure the composition obtained by the process set forth in claim 1.

6. An article obtained by molding under heat and pressure the composition obtained by the process set forth in claim 2.

FRED W. HOOVER.
GORDON T. VAALA.